Patented May 9, 1950

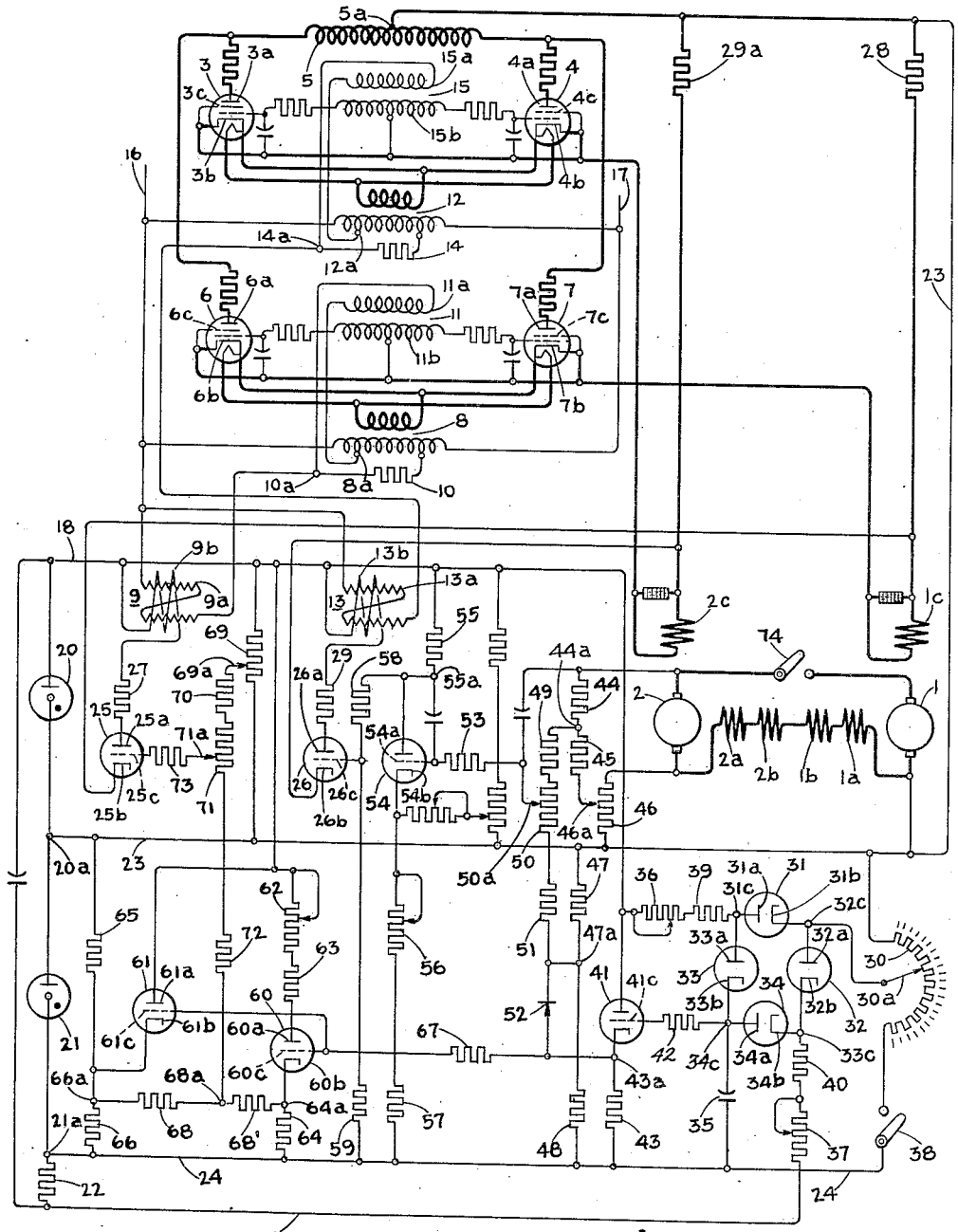
May 9, 1950
E. H. DINGER ET AL
2,507,198
MOTOR SPEED CONTROL SYSTEM
Filed March 12, 1949
Inventors:
Edward H. Dinger,
Robert R. Thatcher,
by Claude H. Mott
Their Attorney.

2,507,198

UNITED STATES PATENT OFFICE 2,507,198

MOTOR SPEED CONTROL SYSTEM

Edward H. Dinger and Robert R. Thatcher, Schenectady, N. Y., assignors to General Electric Company, a corporation of New York Application March 12, 1949, Serial No. 81,052

7 Claims. (Cl. 318—154)

This invention relates to control systems, more particularly to systems for controlling the speed of an electric motor, and it has for an object the provision of a simple, reliable and efficient control system of this character.

More specifically, the invention relates to motor control systems in which the motor is supplied from an adjustable voltage generator and in which the speed of the motor is varied between zero and base speed by varying the generator voltage and above base speed by varying the excitation of the motor field. A further object of the invention is the provision of an electronic control system which will respond to a range of values of an adjustable reference voltage for varying the excitation of the generator field while maintaining the excitation of the motor field at a maximum and which will respond to a second range of values of the reference voltage to vary the excitation of the motor field while maintaining the excitation of the generator field substantially constant.

In carrying the invention into effect in one form thereof, a motor is supplied from an adjustable voltage generator. An electric valve provided with an anode, a cathode and a control grid is connected across a substantially constant source of voltage. Between the cathode and the negative terminal of the source is connected a resistor which provides for cathode follower operation of the valve. There is also provided a source of reference voltage having a first range of values and a second range of values. Means responsive to values of the reference voltage within the first range vary the excitation of the generator thereby to vary its voltage and the speed of the motor. The reference voltage is also supplied to the grid and cathode of the electric valve which operates at saturation in response to values of the reference voltage within the first range of values and as a cathode follower in response to values within the second range. The excitation of the motor field is varied in response to variations of the voltage drop across the resistor in the cathode circuit of the electric valve and consequently in response to variation of the reference voltage within the second range of values.

For a better and more complete understanding of the invention, reference should now be had to the following specification and to the accompanying drawing of which the single figure is a simple schematic diagram of an embodiment of the invention.

Referring now to the drawing, the armature 1 of a direct current motor is supplied from an adjustable voltage generator with the armature 2 to which the armature of the motor is connected in a loop circuit which includes the commutating field windings 1a and 2a and the series compensating field windings 1b and 2b. The motor is also provided with a separately excited field winding 1c and similarly the generator is provided with a separately excited field winding 2c.

Direct voltage is supplied to the generator field winding 2c from a pair of electric valves 3 and 4 which in turn are supplied with alternating voltage from a suitable source such as represented by the transformer secondary winding 5. Similarly the motor field winding 1c is supplied with direct voltage from a pair of electric valves 6 and 7 which are also supplied from the secondary winding 5. Although the electric valves 3, 4, 6 and 7 may be of any suitable type, they are preferably FG-95 thyratrons. They are provided respectively with anodes 3a, 4a, 6a and 7a, cathodes 3b, 4b, 6b and 7b, and control grids 3c, 4c, 6c and 7c.

The anodes 3a and 4a of thyratrons 3 and 4 are connected through suitable resistors to opposite terminals of the secondary winding and the cathodes 3b and 4b are connected through the generator field winding 2c to the center tap 5a. The anodes 6a and 7a of thyratrons 6 and 7 are similarly connected to opposite terminals of the secondary winding and the cathodes 6b and 7b are connected through the motor field winding 1c to the center tap.

For controlling the output voltage of the thyratrons any suitable method may be employed. It is preferred, however, to utilize the method of phase shift of the grid voltage with respect to the anode voltage. To this end suitable phase shifting networks are provided. The phase shifting network for thyratrons 6 and 7 is in the form of a bridge of which portions of the autotransformer winding 8 constitute two of the arms and the reactance winding 9a of a saturable reactor 9 and a resistor 10 constitute the two remaining arms. Across the output terminals 8a and 10a of the bridge is connected the primary winding 11a of a grid transformer 11 of which the secondary winding 11b is connected between the grids 6c and 7c of thyratrons 6 and 7. The center tap of winding 11b is connected to the common cathode connection of the thyratrons so that corresponding halves of the winding are connected between the cathode and control grid of each thyratron.

A similar phase shifting bridge is provided for controlling thyratrons 3 and 4. It comprises the winding 12 of an autotransformer, the reactance winding 13a of saturable reactor 13 and resistor 14. The primary winding 15a of a grid transformer 15 is connected between the output terminals 12a and 14a, and opposite halves of the secondary winding 15b are connected between the cathodes and grids of thyratrons 3 and 4.

Alternating voltage is supplied to the input terminals of the two phase shifting bridges from a suitable source, such as represented by the two supply conductors 16 and 17, which is preferably the same source as that from which the anode voltages are derived. When the reactors 9 and 13 are unsaturated, the voltages induced in the secondary windings 11b and 15b lag the anode voltages of thyratrons substantially 180 electrical degrees and when the reactors are saturated, the voltages induced in the secondary windings are substantially in phase with the anode voltages. For intermediate values of saturation of the reactors, the voltages induced in the secondary windings have corresponding intermediate phase relationships with respect to the anode voltages. The currents conducted by the thyratrons are maximum when the grid and anode voltages are substantially in phase and minimum when they are substantially 180 degrees out of phase. For intermediate phase relationships the currents conducted by the thyratrons have corresponding intermediate values.

For controlling saturation, the reactors 9 and 13 are provided with D. C. saturating windings 9b and 13b, respectively. Direct voltage is supplied to the saturating windings from a suitable source, such as represented by the supply conductors 18 and 19. Between the supply conductors two voltage regulating valves 20 and 21 and a resistor 22 are connected in series relationship. The valves 20 and 21 are preferably OC3/VR105 glow tubes. A characteristic of a tube of this type is that within its operating range the voltage across its anode and cathode remains substantially constant despite large changes in its current. Variations in the supply line voltage are largely absorbed by the resistor 22. It will be noted that the valves 20 and 21 and the resistor 22 constitute a voltage divider. It may be assumed that the voltage across the supply conductors 18 and 19 is 315 volts and that the voltage at the points 21a and 20a are 105 volts and 210 volts, respectively, with respect to conductor 19. Conductors 23 and 24, which are respectively connected to points 20a and 21a, constitute buses from which various parts of the control are supplied.

For the purpose of varying the current flowing in the saturating windings of the reactors, electric valves 25 and 26 are provided. They are respectively provided with anodes 25a and 26a, cathodes 25b and 26b, and control grids 25c and 26c. Preferably these valves are of the 6SN7GT type.

The anode-cathode circuit of the valve 25 extends from the positive supply conductor 18 through saturating winding 9b, resistor 27, anode 25a, cathode 25b and resistor 28 to the supply bus 23. The resistor 28 is in series with the motor field winding 1c and conducts the motor field current. Consequently, its connection in the cathode circuit of valve 25 applies a voltage at the cathode 25b of valve 25 which is proportional to the motor field current. This voltage is compared to a voltage at the grid 25c of valve 25 to control the excitation of the motor field. Similarly, the anode-cathode circuit of valve 26 is traced from the positive supply conductor 18 through saturating winding 13b, resistor 29, anode 26a, cathode 26b and resistor 29a to bus 23. Since the resistor 29a is connected in the generator field circuit it conducts the generator field current and its connection in the cathode circuit of valve 26 provides a degenerative feedback which reduces the effective time constant of the generator field and improves the response of changes in the generator field current to changes in the grid voltage of valve 26.

For the purposes of providing an adjustable reference voltage for controlling the variation of the excitation of the generator field and the motor field, a unit is provided which comprises a speed controlling potentiometer 30, four diode electric valves 31, 32, 33 and 34, a capacitor 35 and rheostats 36 and 37 for varying the time constant of the capacitor circuits to control the rates of charge and discharge. Although the diode valves may be of any suitable type, they are preferably 6H6 rectifier valves.

The speed control potentiometer is connected in series with the contacts of a switch 38 across the buses 23 and 24. The valves 31 and 32 are connected in series relationship with each other and similarly valves 33 and 34 are connected in series relationship with each other and in parallel with the valves 31 and 32. The anodes 31a and 33a are connected through a resistor 39 and rheostat 36 to the positive supply conductor 18, and the cathodes 32b and 34b are connected through resistor 40 and rheostat 37 to the negative supply conductor 19.

As shown, the slider 30a of the speed control potentiometer is connected to the cathode 31b and anode 32a and capacitor 35 is connected between the negative supply conductor 24 and the cathode 33b and anode 34a. Across the supply conductors 18 and 24 is connected an electric valve 41 of which the control grid 41c is connected through a resistor 42 to the junction point of the cathode 33b and anode 34a. A resistor 43 connected in the cathode circuit of valve 41 provides cathode follower operation. The voltage which appears across the cathode follower resistor 43 is the reference voltage which is utilized for producing timed acceleration and deceleration of motor 1.

The reference voltage unit functions in the following manner to produce the reference voltage. In the steady state condition points 31c, 32c, 33c and 34c will be at approximately the same voltage. The resistors 39 and 40 are preferably of high impedance, e. g. .5 megohm each. With a total impedance of a megohm in the circuit the tube drop of the valves 31, 32, 33 and 34 is substantially zero. Valve 31 prevents the voltage at point 31c from becoming more positive than the voltage of point 32c. Similarly valve 32 prevents the voltage at point 33c from becoming more negative than point 32c. The conducting action of valves 33 and 34 hold the voltage at point 34c equal to the voltage at points 31c and 33c. When the voltage at point 32c is made more positive by movement of the slider 30a in a counterclockwise direction, the voltage at point 33c also becomes more positive owing to the action of valve 32. This results in cutting off valves 31 and 34 since the voltages of points 31c and 34c are maintained unchanged momentarily by the charge on capacitor 35. With valves 31 and 34 cut off, capacitor 35 begins to charge through resistor 39 and rheostat 36 at a rate determined by the setting of the rheostat, and the voltage across its terminals increases correspondingly. Responsively to this increasing voltage the conduction of valve 41 is increased thereby increasing the voltage drop across resistor 43 until the voltage at the cathode is substantially equal to the voltage of the grid which is equal to the voltage of the point 34c. In other words, the voltage across the resistor 43 changes with the voltage across the capacitor and at the same rate. Valve 31 begins to conduct again when the voltage at point 31c has increased to the value of the voltage at point 32c, thereby to prevent any further increase of voltage at points 31c and 34c and the circuit returns to the steady state condition.

Upon movement of the slider 30a in a clockwise direction to a position of less positive voltage on the potentiometer, the voltage at point 31c is made correspondingly less positive by the action of valve 31. This results in the cut-off of valves 32 and 33 since the voltage at the points 33c and 34c is instantaneously maintained by the charge on the capacitor. With valves 32 and 33 cut off, the capacitor begins to discharge through resistor 40 and rheostat 37 at a rate determined by the setting of the rheostat. Simultaneously the reference voltage across the cathode follower resistor 43 will decrease as the voltage across the capacitor decreases and at the same rate. Valve 32 conducts again when the voltage at point 33c has decreased to the voltage at point 32c. This prevents any further decrease in the voltage at the points 33c and 34c and the circuit is returned to the steady state condition. Thus the reference voltage unit produces across the resistor 43 an adjustable reference voltage having rates of increase or decrease which can be separately varied.

The above described adjustable reference voltage unit is not our joint invention but is the sole invention of Robert R. Thatcher and is described and claimed in copending application Serial No. 118,326, filed in the name of Robert R. Thatcher and assigned to the same assignee as this application.

By means of a suitable parallel feed circuit the armature voltage of generator 2 is compared with the reference voltage and a selected portion of the difference of the two voltages is utilized to control the excitation of the generator. This circuit is illustrated as comprising a voltage divider made up of two resistors 44 and 45 connected between the positive terminal of the generator 2 and the slider 46a of a potentiometer 46 which is connected across the commutating and compensating field windings 2a, 2b, 1a, 1b, together with a voltage divider comprising resistors 47 and 48 connected across the buses 23 and 24 and a third voltage divider comprising resistor 49, potentiometer 50 and resistor 51 connected in series relationship between the intermediate point 44a of the first divider and the intermediate point 47a of the second divider. Between the cathode terminal 43a of cathode follower resistor 43 and the intermediate point 47a is connected a rectifier 52 which may be of any suitable type but is preferably a surface contact type rectifier such as the copper oxide rectifier or the selenium rectifier.

The slider 50a of potentiometer 50 is connected through resistor 53 to the grid 54a of an electric valve 54 which is connected between the supply conductor 18 and bus 24.

In the anode circuit of valve 54 is connected a resistor 55 and in the cathode circuit is connected a rheostat 56 and a resistor 57. For all values of the reference voltage across resistor 43, which produce at the point 43a a voltage that is more positive than the voltage of the point 47a, the comparison circuit described in the foregoing supplies between the grid 54a and cathode 54b of valve 54 a voltage which is a fraction of the difference of the voltage between bus 23 and point 43a and the armature voltage of generator 2. The ratio of the armature voltage to the voltage between bus 23 and point 43a may be varied within limits by varying the setting of potentiometer 50. The current conducted by the valve 54 varies in response to variations in the grid voltage and produces corresponding voltage drops across the anode resistor 55. A selected portion of the variation in the voltage at the anode terminal 55a of resistor 55 is supplied to the grid 26c of valve 26 by means of a voltage divider comprising resistors 58 and 59 connected between anode terminal 55a and bus 24 together with a connection from intermediate point 58a to the grid 26c.

From the foregoing it is seen that movement of the slider 30a in a clockwise direction causes the voltage of the grid 54a to become more negative, thereby decreasing the current conducted by valve 54 and correspondingly decreasing the voltage drop across resistor 55, with the result that the voltage supplied to the grid 26c becomes more positive. This increases the current conducted by the valve 26, thereby increasing the saturation of the reactor 13 and increasing the excitation of the generator field winding 2c. The resulting increase in the armature voltage of the generator reduces the differential voltage supplied to the grid 54a. In other words, the voltage of the grid 54a becomes less negative as the generator voltage increases, thereby retarding the rise of the generator voltage and finally terminating the rise of generator voltage when a balanced condition between the generator voltage and the reference voltage is reached. The increase of the generator voltage closely follows the decrease in the reference voltage across resistor 43. Since the rate of decrease of the reference voltage depends upon the setting of rheostat 37, the rate of rise of the generator voltage 15 and the acceleration of motor 1 likewise depend upon the setting of rheostat 37. Movement of the slider 30a in a counterclockwise direction operates in a reverse manner to decrease the voltage of the generator. The rate of decrease of the generator voltage and the rate of deceleration of the motor depend upon the setting of rheostat 36.

For the purpose of controlling the valve 25 to weaken the motor field after the generator voltage has reached its maximum value, a pair of electric valves 60 and 61 are provided. The valve 60 is connected from the positive supply conductor 18 to the bus 24. A rheostat 62 and a fixed resistor 63 are connected in circuit between the positive conductor 18 and the anode 60a and a resistor 64 is connected between the cathode 60b and bus 24 to provide cathode follower operation. The anode 61a of valve 61 is connected to the positive supply conductor 18 and the cathode 61b is connected to an intermediate point 65a of a voltage divider which comprises resistors 65 and 66 connected in series relationship across the buses 23 and 24. Both control grids 60c and 61c are connected through a resistor 67 to the cathode terminal 43a of the reference voltage resistor 43. Although the valves 41, 54, 60 and 61 may be of any suitable type, they are preferably 6SN7GT valves.

Between the cathode terminals 64a and 66a of resistors 64 and 66 is connected a voltage divider which comprises resistors 68 and 68′. Between the intermediate point 68a of this voltage divider and the slider 69a of a potentiometer 69, which is connected between supply conductor 18 and bus 23, is connected another voltage divider which comprises resistor 70, potentiometer 71 and resistor 72. The grid 25c of valve 25 is connected through a resistor 73 to the slider 71a of potentiometer 71.

The reference voltage which is supplied to the motor field control, i. e. to the grids 60c and 61c, remains substantially constant as long as the voltage of point 43a is positive with respect to an arbitrarily chosen voltage which is determined by the adjustment of potentiometer 62. The value of this arbitrary voltage depends on the ratio between the anode circuit and cathode circuit impedances of valve 60. When point 43a is positive with respect to this arbitrary voltage, the valve 60 is operating under essentially maximum saturated condition, i. e. further increases in the grid voltage do not produce any increase in the anode-cathode current. Consequently, variations in the voltage of point 43a which do not make it negative with respect to the arbitrary voltage mentioned in the foregoing will produce no change in voltage of the point 64a. Under this condition the voltage of the grid 60c remains constant owing to the grid current of valve 60 flowing through resistor 67. Since the grid 61c of valve 61 is directly connected to grid 60c, the voltages of points 66a and 68a and the voltage of grid 25c of valve 25 also remain constant as long as the voltage of grid 60c remains constant. Consequently, the excitation of the motor field winding 1c remains constant at maximum strength for changes in the voltage of point 43a which do not make it negative with respect to the arbitrary voltage.

For values of the reference voltage across resistor 43 within the range in which the voltage of the point 43a is negative with respect to the arbitrary voltage described in the foregoing, the valves 60 and 61 operate as cathode followers. Consequently, variations of the reference voltage within this range produce corresponding variations of the voltage at the points 64a, 66a and 68a and of the grid 25c. As a result, the excitation of the motor field winding 2c and the speed of the motor are correspondingly varied.

In order to maintain the acceleration of the motor substantially constant within the field weakening range and to cause the speed of the motor to be approximately proportional to the setting of the speed adjusting potentiometer 30, the control circuit for the valve 25 is arranged to change the constant of proportionality between the voltages at the points 43a and 68a at a predetermined point in the field weakening range.

As the voltage at point 64a is decreased, i. e. made less positive, by cathode follower operation of valve 60, the voltage of point 66a is decreased by approximately the same amount by cathode follower action of valve 61. Consequently, the voltage of intermediate point 68a is decreased by the same amount. This relationship between the voltages of the points 64a, 66a and 68a is maintained as long as the voltage of point 66a is positive with respect to a predetermined value of voltage which is determined by the voltage divider 65, 66. When the voltage of point 66a decreases to this predetermined value, further decrease in the voltage of point 43a causes the valve 61 to cut off while valve 60 continues to operate as a cathode follower. Thus, in response to further decrease of the reference voltage, i. e. the voltage of point 43a, the voltage of point 66a remains constant while the voltage of point 64a continues to decrease in response to cathode follower action of valve 60. Consequently further decreases of the voltage of point 68a are smaller in value than decreases of voltage of point 64a by an amount depending upon the ratio of resistors 68' and 68. Assuming these resistors to be equal, further decreases in the voltage of point 68a will be one-half the value of decreases in the voltage of point 64a. As a result, the rates of acceleration and deceleration of the motor within the field weakening range are substantially constant and the speed of the motor is approximately proportional to the setting of the speed control potentiometer 30.

With the foregoing understanding of the elements and their organization, the operation of the system itself will readily be understood from the following description.

The contacts of switch 74 are assumed to be in the open position in which they are illustrated. The armature of motor 1 is thus disconnected from the generator. Also the contacts of switch 38 are open so that the voltage of point 32c is maximum and the capacitor 35 is fully charged.

Consequently the reference voltage across resistor 43 will be at maximum value with the result that valve 54 will be fully conducting and valve 26 will be at cut-off and the phase of the grid voltage of thyratrons 3 and 4 will be fully retarded. The excitation of the generator field 2c and the armature voltage of the generator will be minimum.

Responsively to the maximum value of reference voltage, the valve 60 will be operating essentially at saturation and valve 61 fully conducting, but not in the saturated range. Thus the voltages of the point 68a and the grid 25c will be at maximum value with the result that the phase of the grid voltages of thyratrons 6 and 7 is fully advanced and the thyratrons supply maximum exciting current to the motor field winding 1c. Under these conditions, the motor is at standstill.

The desired operating speed of the motor 1 may be preset by rotating the slider 30a in a clockwise direction to a position which corresponds to the desired value. Assuming that it is desired to operate the motor at maximum speed, the slider is rotated to the maximum speed position at the lower end of the potentiometer. The switches 38 and 74 are then closed simultaneously to complete the potentiometer circuit and the loop circuit for the armatures of the motor and generator.

In response to the closing of contacts 38 the voltages of points 32c and 33c are suddenly reduced to the value of the voltage of bus 24 and the capacitor 35 begins to discharge at a rate determined by the setting of rheostat 37. The reference voltage across resistor 43 decreases at the same rate thereby advancing the phase of the grid voltages of the thyratrons 3 and 4 and correspondingly increasing the excitation of the generator field winding 2c and correspondingly increasing the generated voltage. In response to the increasing voltage supplied to its armature terminals the motor 1 accelerates at a rate equal to the rate of decrease of the reference voltage which, as stated in the foregoing, depends on the setting of acceleration control rheostat 37.

At a predetermined value of the reference voltage the maximum phase advance of the grid voltages of thyratrons 3 and 4 is obtained. The ratio of resistors 47 and 48 is so chosen that the point 47a is equal to or slightly more positive than this predetermined value. Consequently, when this predetermined value of reference voltage is reached, the rectifier 52 isolates the generator field control from the reference voltage. While the generator voltage was increasing and the motor accelerating, the voltage of the grids 60c and 61c remained constant, as explained in the foregoing, so that variation of the reference voltage within this first range of values between maximum and the predetermined value had no influence on the control of the motor field which remained at maximum strength.

However, as the reference voltage reaches the predetermined value, the voltage of grid 60c becomes sufficiently negative that further decreases in the reference voltage result in decreasing the currents conducted by valves 60 and 61 and correspondingly decreasing the voltage of point 66a. This results in retarding the phase of the grid voltages of thyratrons 6 and 7, thereby weakening the excitation of the motor field and further accelerating the speed of the motor. This field weakening and resulting acceleration proceeds at a rate approximately equal to the rate of decrease in reference voltage until a value of field current is reached beyond which the motor speed increases at a rate greater than the rate of field weakening. However, when this point is reached, further decreases in the reference voltage produce no further decrease in the voltage of point 66a but continue to decrease the voltage of point 64a. The voltage of point 68a continues to decrease in response to decrease of voltage of the point 64a but at a lower rate owing to the intermediate position of point 68a on the divider 67, 68. Consequently, further weakening of the motor field proceeds at a rate lower than but proportional to the rate of decrease of the reference voltage and the acceleration proceeds at a rate approximately equal to the rate of decrease of the reference voltage.

Thus, in response to variation of the reference voltage within its second range of values from the predetermined value to the minimum value, the motor is accelerated to maximum speed.

It is not essential that the beginning of the field weakening range should coincide with the point of maxium generator voltage. It may be desirable to begin weakening the field before maximum generator voltage is reached. A certain amount of overlapping of the generator voltage and field weakening ranges may be produced by adjustment of rheostat 62.

To decelerate the motor to a lower speed, the slider of the potentiometer is rotated counterclockwise to a position corresponding to the desired lower speed. This causes the capacitor 35 to charge at a rate determined by the setting of the deceleration rheostat 38 and the reference voltage across resistor 43 increases correspondingly. As the reference voltage increases, the voltage of point 68a increases, thereby advancing the phase of the grid voltage of thyratrons 6 and 7. The resulting strengthening of the motor field effects a corresponding deceleration of the motor at a rate approximately equal to the rate of increase of reference voltage. During this initial part of the deceleration the reference voltage of point 43a is more negative than point 47a and consequently the increasing reference voltage has no influence on the control of the generator field. When the reference voltage reaches the predetermined value at which the voltage of point 43a becomes more positive than the voltage of point 47a, the grid 60c begins to draw current and further increases of the reference voltage produce no further increase of the currents conducted by valves 60 and 61 and hence have no influence on the motor field control. However, increase of the reference voltage beyond this predetermined value produces phase retardation of the grid voltages of the thyratrons 3 and 4 which in turn produces a decrease in the voltage of the generator and a corresponding deceleration of the motor which continues until the desired new low speed has been reached.

Thus acceleration to a higher speed or deceleration to a lower speed may be produced by movement of the slider 30a to the position corresponding to the desired speed, and the acceleration or deceleration follows at a rate determined by the setting of the acceleration and deceleration rheostats, respectively.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A control system comprising an adjustable voltage generator provided with a field winding, an electric motor supplied from said generator and provided with a field winding, a source of adjustable reference voltage variable through a predetermined range of values in a predetermined interval of time, means for deriving a signal voltage from the armature voltage of said generator, means responsive to the difference of said voltages for values of said reference voltage within a first range for varying the excitation of said generator field, means responsive to said reference voltage in a second range of values for varying the excitation of said motor field comprising a source of substantially constant voltage, an electric valve connected across said source and provided with an anode, a cathode and a control grid, a resistor connected in the cathode circuit of said valve to provide cathode follower operation thereof, connections for supplying said reference voltage between said grid and cathode, the values of said reference voltage within said first range producing saturation of said valve, and the values within said second range producing corresponding values of current in the anode-cathode circuit of said valve, and means responsive to the variations in voltage across said cathode resistor for varying the excitation of said motor field winding.

2. A control system comprising an adjustable voltage generator provided with a field winding, an electric motor supplied from said generator and provided with a field winding, a source of substantially constant voltage, an electric valve having an anode, a cathode and a control grid and having its anode-cathode circuit connected across said source, a resistor connected in the cathode circuit of said valve, a source of adjustable reference voltage having first and second ranges of values, means responsive to values of reference voltage in said first range for varying the excitation of said generator field to vary the speed of said motor, connections from said reference voltage source to said grid and cathode for supplying said reference voltage thereto to produce saturation of said valve in response to values of said reference voltage in said first range, and to produce cathode follower operation of said valve in response to values of said voltage within said second range, and means responsive to variations of the voltage across said resistor for varying the excitation of said motor field winding.

3. A control system comprising in combination an adjustable voltage generator provided with a field winding, an electric motor supplied from said generator and provided with a field winding, a source of substantially constant voltage, an electric valve provided with an anode, a cathode and a control grid and having its anode-cathode circuit connected across said source, a source of adjustable reference voltage having first and second ranges of values, means responsive only to values of said reference voltage within said first range for varying the excitation of said generator field to vary the speed of said motor, a resistor in the cathode circuit of said valve, connections from said reference voltage source to said grid and cathode for supplying said reference voltage thereto to produce saturation of said valve in response to values of said reference voltage within said first range and to produce cathode follower operation in response to values of said reference voltage within said second range, means responsive to variations in voltage across said resistor for varying the excitation of said motor field to vary the speed of said motor, and a variable resistor in the anode circuit of said valve for effecting cathode follower operation of said valve in response to a selected sub-range of values of reference voltage within said first range to provide simultaneous strengthening of said generator field and weakening of said motor field.

4. A control system comprising in combination, an adjustable voltage generator provided with a field winding, an electric motor supplied therefrom and provided with a field winding, a source of substantially constant voltage, a first electric valve provided with an anode, a cathode and a control grid, and having its anode-cathode circuit connected across said source, a resistor connected in said cathode circuit, a source of adjustable reference voltage having first and second ranges of values, a phase shifting network responsive to values of said reference voltage within said first range and a second electric valve controlled by said network for varying the excitation of said generator field winding to vary the speed of said motor, connections from said source of reference voltage to the grid and cathode of said first valve for supplying said reference voltage thereto to effect saturation of said first valve in response to values of reference voltage in said first range and cathode follower operation in response to values of said reference voltage within said second range, a phase shifting network responsive to variations in voltage across said resistor and an electric valve controlled thereby for varying the excitation of said motor field winding, and a variable resistor in the anode circuit of said first valve for effecting cathode follower operation of said first valve in response to values of said reference voltage within a selected portion of said first range to provide overlapping of the strengthening of said generator field and the weakening of said motor field.

5. A control system comprising in combination an adjustable voltage generator provided with a field winding, an electric motor supplied therefrom and provided with a field winding, a source of substantially constant voltage, a first electric valve provided with an anode, a cathode and a control grid and having its anode connected to the positive side of said source and its cathode connected to the negative side of said source, a resistor connected in the cathode circuit of said valve, a voltage divider energized from said source, a second electric valve having an anode, a cathode and a control grid and having its anode connected to the positive side of said source and its cathode connected to an intermediate point on said divider, a source of adjustable reference voltage having first and second ranges of values, means responsive to values of reference voltage in said first range for varying the excitation of said generator field winding to vary the speed of said motor, connections from said reference voltage source to the grids and cathodes of said valves for supplying said reference voltage thereto to produce saturation of said first valve in response to values of said reference voltage in said first range and cathode follower operation of both said valves in response to values of said reference voltage in said second range, a second voltage divider connected across the cathode circuits of said valves, and means responsive to the voltage of an intermediate point of said second divider for varying the excitation of said motor field winding.

6. A control system comprising in combination an adjustable voltage generator provided with a field winding, an electric motor supplied therefrom and provided with a field winding, a source of substantially constant voltage, a first electric valve provided with an anode, a cathode and a control grid and having its anode connected to the positive side of said source and its cathode connected to the negative side of said source, a resistor connected in the cathode circuit of said valve, a voltage divider connected between the negative terminal of said source and a point having a voltage intermediate the positive and negative terminal voltages of said source, a second electric valve having an anode, a cathode and a control grid and having its anode connected to the positive terminal of said source and its cathode connected to an intermediate point on said divider, a source of adjustable reference voltage having first and second ranges of values, means responsive to values of reference voltage in said first range for varying the excitation of said generator field winding to vary the speed of said motor, connections from said reference voltage source to the grids and cathodes of said valves for supplying a voltage thereto to produce saturation of said first valve in response to values of said reference voltage in said first range and cathode follower operation of both said valves in response to values of said reference voltage in said second range, a second voltage divider connected between the cathodes of said valves, a phase shifting network responsive to the voltage of an intermediate point of said second divider for varying the excitation of said motor field winding and an adjustable resistor in the anode circuit of said first valve for effecting cathode follower operation of both said valves in response to values of said reference voltage within a selected portion of said first range to provide overlapping of the operations of strengthening the generator field and weakening the motor field.

7. A control system comprising an adjustable voltage generator provided with a field winding, a motor supplied therefrom and provided with a field winding, a source of substantially constant voltage, a voltage divider connected across said source, a first conductor connected to an intermediate point on said divider, a second conductor connected to an intermediate point on said divider between the negative terminal of said source and said intermediate point, first and second rectifier valves each provided with an anode and a cathode, a first variable resistor connected between the anodes of said valves and the positive terminal of said source, third and fourth rectifier valves each having an anode and a cathode, the anode of said third valve being connected to the cathode of said first valve and the anode of said fourth valve being connected to the cathode of said second valve, a second variable resistor connected from the negative terminal of said source to the cathodes of said third and fourth valves, a potentiometer connected across said first and second conductors and having its slider connected to the cathode of said second valve and the anode of said fourth valve, a capacitor connected between said second conductor and the cathode of said first valve and anode, said capacitor providing at its terminals a variable reference voltage having first and second ranges of values, a control electric valve having an anode, a cathode and a control grid and having its anode-cathode circuit connected across said source, a resistor connected in said cathode circuit of said control valve, means responsive to values of reference voltage in said first range for varying the excitation of said generator field to vary the speed of said motor, connections from said capacitor to the grid and cathode of said control valve for supplying said reference voltage thereto to produce saturation of said control valve in response to values of said reference voltage in said first range, and to produce cathode follower operation of said control valve in response to values of said reference voltage within said second range, and means responsive to variations of the voltage across said resistor in the cathode circuit of said control valve for varying the excitation of said motor field winding.

EDWARD H. DINGER.
ROBERT R. THATCHER.

No references cited.